(12) United States Patent
Karve et al.

(10) Patent No.: US 8,601,253 B2
(45) Date of Patent: Dec. 3, 2013

(54) DYNAMIC PROVISIONING IN DATA PROCESSING ENVIRONMENT

(75) Inventors: Alexei Arun Karve, Mohegan Lake, NY (US); Ajay Mohindra, Yorktown Heights, NY (US); Randy Allan Rendahl, Raleigh, NC (US); Alla Segal, Mount Kisco, NY (US)

(73) Assignee: International Business Machines Corporation, Armonk, NY (US)

( * ) Notice: Subject to any disclaimer, the term of this patent is extended or adjusted under 35 U.S.C. 154(b) by 1423 days.

(21) Appl. No.: 12/108,836

(22) Filed: Apr. 24, 2008

(65) Prior Publication Data

US 2009/0271607 A1    Oct. 29, 2009

(51) Int. Cl.
*G06F 1/24*   (2006.01)
*G06F 9/00*   (2006.01)

(52) U.S. Cl.
USPC .................... 713/100; 379/15.03; 370/229

(58) Field of Classification Search
USPC .................... 713/100; 379/15.03; 370/229
See application file for complete search history.

(56) References Cited

U.S. PATENT DOCUMENTS

| | | | |
|---|---|---|---|
| 6,385,664 B1 | 5/2002 | Drees | |
| 6,807,266 B2* | 10/2004 | Tripathi et al. | 379/201.12 |
| 6,901,440 B1 | 5/2005 | Bimm et al. | |
| 7,523,461 B2* | 4/2009 | Ghanaie-Sichanie et al. | 719/316 |
| 7,640,542 B2* | 12/2009 | Herenyi et al. | 717/177 |
| 7,703,022 B2 | 4/2010 | Arthurs et al. | |
| 2003/0167320 A1* | 9/2003 | Perez | 709/223 |
| 2003/0204560 A1* | 10/2003 | Chen et al. | 709/203 |
| 2005/0160434 A1 | 7/2005 | Tan et al. | |
| 2006/0029054 A1* | 2/2006 | Breh et al. | 370/385 |
| 2006/0048097 A1 | 3/2006 | Doshi | |
| 2006/0080424 A1* | 4/2006 | Sun et al. | 709/223 |
| 2006/0190569 A1* | 8/2006 | Neil et al. | 709/220 |

(Continued)

FOREIGN PATENT DOCUMENTS

| | | |
|---|---|---|
| CN | 101006442 A | 7/2007 |
| EP | 1420337 | 5/2004 |

(Continued)

OTHER PUBLICATIONS

International Search Report for PCT/US09/41665 dated Jun. 16, 2009.
J. Plomp et al., "Comparing Transcoding Tools for Use with a Generic User Interface Format," Extreme Markup Languages, 2002, 18 pages, Canada.

*Primary Examiner* — Jaweed A Abbaszadeh
(74) *Attorney, Agent, or Firm* — Preston J. Young; Ryan, Mason & Lewis, LLP

(57) ABSTRACT

Techniques are disclosed for the dynamic introduction of new components to be used during provisioning of solutions in data processing system environments such as service delivery environments. For example, in a provisioning system that manages provisioning of components in a data processing system, an automated method of dynamically provisioning one or more new components in the data processing system comprises the provisioning system performing the following steps. The provisioning system accepts a registration of a new component during a runtime period of the data processing system, wherein the new component has not been previously registered in the data processing system prior to the runtime period, and further wherein the registration comprises obtaining information relating to at least one of one or more prerequisites and a configuration associated with the new component. The provisioning system causes a modification to the data processing system by enabling use of the registered new component therein.

24 Claims, 9 Drawing Sheets

(56) References Cited

U.S. PATENT DOCUMENTS

| | | |
|---|---|---|
| 2006/0233126 A1* | 10/2006 | Herenyi et al. ............... 370/328 |
| 2007/0067630 A1 | 3/2007 | Lenkov et al. |
| 2007/0245357 A1* | 10/2007 | Breiter et al. ................ 719/320 |
| 2007/0271554 A1 | 11/2007 | Fletcher et al. |
| 2008/0077709 A1 | 3/2008 | Zhuang |
| 2009/0055888 A1* | 2/2009 | Little ............................... 726/1 |
| 2009/0064133 A1* | 3/2009 | Suchy et al. .................. 717/177 |
| 2009/0193426 A1* | 7/2009 | Bernabeu-Auban et al. . 718/104 |
| 2012/0185778 A1 | 7/2012 | Arthurs et al. |

FOREIGN PATENT DOCUMENTS

| | | |
|---|---|---|
| EP | 1420337 A1 | 5/2004 |
| JP | H04242426 A | 8/1992 |
| JP | 2007538313 A | 12/2007 |
| WO | 2005106666 A1 | 11/2005 |

* cited by examiner

LOGICAL ARCHITECTURE

FIG. 4 SAMPLE COMPONENT DESCRIPTOR

```xml
<component name="Lotus Connections" version="1.0" id="LotusConnections">
<location-in-repository>LotusConnections1_0</location-in-repository>
<prerequisites>
<prerequisite name="DB2" version="9.2" shared="false" id="DB2_9"/>
<!-- id can be added during step 1 where prerequisites are selected from the list; used to identify component in the repository -->
<local-or-remote>remote</local-or-remote>
</prerequisite>
<prerequisite name="Tivoli Directory Server" version="6.0" shared="true" id="LDAP">
<local-or-remote>remote</local-or-remote>
</prerequisite>
<prerequisite name="WebSphere Application Server" version="9.1" id="WAS_9">
<local-or-remote>local</local-or-remote>
</prerequisite>
<prerequisite name="IBM HTTP Server">
<local-or-remote>local</local-or-remote>
</prerequisite>
</prerequisites>
<bundled-with/> <!--only one component, not bundled with anything -->
<configuration>
<multitenancy>
<sharing>offering,tenant</sharing>
<instanceAdditionScripts>/LC/addInstance.sh<instanceAdditionScripts>
</multitenancy>
<subcomponents>
<subcomponent name="Activities">
<attributes> <!-- attributes specific to this subcomponent -->
```

*FIG. 4 cont.*

```xml
<attribute displayName="Statistics Location" internalName="Statistics" type="longtext">
    </attribute>
  </attributes>
<!--additional attributes may go here -->
</subcomponents>
<server-requirements>
  <server for="DB2_9">
    <!--filter is combined with that stored in the repository for DB2 9, only addl reqs here-->
    <filter>
      <role>Generic</role>
        <preinstalled>optional</preinstalled>
        <min-cpu>200</minCPU>
        <min-disk>2GB</min-disk>
        <memory>2GB</memory>
    </filter>
  </server>
  <!- - servers for WAS needs to be described here -->
  <server for="LotusConn" minNum="1" maxNum="undefined">
  <!- - includes all components marked local; max und -->
  </server>
</server-requirements>
<attributes> <!-- attributes common to all subcomponents -->
  <attribute displayName="DB2 User Id" internalName="userid" type="text"/>
  <attribute displayName="DB2 Password" internalName="password" type="secret"/>
  <attribute displayName="DB2 port" internalName="db2port" type="integer"/>
</attributes>
</component>
```

EXTENSION OF EXISTING ENVIRONMENT

DYNAMIC PROVISIONING IN DATA PROCESSING ENVIRONMENT

FIELD OF THE INVENTION

The present invention relates generally to data processing systems, service-oriented architecture, and user interfaces. More specifically, the present invention provides apparatus and a computer method for the dynamic introduction of new components to be used during provisioning of solutions in data processing system environments such as service delivery environments.

BACKGROUND OF THE INVENTION

With the increasing popularity of service oriented architectures, solutions are being developed with a service centric model. When a services-based solution needs to be deployed in a datacenter environment, the provisioning has to ensure that all the services that the solution uses have been provisioned and started. Failure to do so would cause the solution to fail at runtime.

Existing systems support components that are defined at the time the system is implemented. For these components, both the parameters and dependencies are well-known. However, as the solutions become more complex, it becomes impossible to statically define all prerequisite components and their requirements at the time the hosting environment is shipped.

As screens used to collect information about each prerequisite and its parameters are defined via the conventional user interface, it is necessary to be able to specify the requirements of each service/component when the component is introduced and subsequently to use this information in select screens presented to the user during submission of provisioning requests. As the user who submits the request may have a different role and expertise from the user that defines the services/components and thus may lack the necessary knowledge, the restrictions for each parameter must also be defined when the service is introduced.

Unfortunately, conventional provisioning systems and user interfaces do not adequately account for the addition of components at runtime.

SUMMARY OF THE INVENTION

Principles of the invention provide techniques for the dynamic introduction of new components to be used during provisioning of solutions in data processing system environments such as service delivery environments.

For example, in a provisioning system that manages provisioning of components in a data processing system, an automated method of dynamically provisioning one or more new components in the data processing system comprises the provisioning system performing the following steps. The provisioning system accepts a registration of a new component during a runtime period of the data processing system, wherein the new component has not been previously registered in the data processing system prior to the runtime period, and further wherein the registration comprises obtaining information relating to at least one of one or more prerequisites and a configuration associated with the new component. The provisioning system permits selection of the registered new component in response to a provisioning request. The provisioning system causes a modification to (e.g., an extension of) the data processing system by enabling use of the registered new component therein.

By way of example, submission of provisioning requests in a service delivery environment involves selecting services and middleware components required by hosted solutions. These requirements may include—specification of prerequisite middleware (e.g., database, process and portal servers, etc.) as well as service components (security, monitoring, etc.). When specifying each of these prerequisite components and services, the user specifies configuration parameters (e.g., location of servers, ports, user identifiers, passwords, etc). These parameters are different for each middleware component.

Advantageously, principles of the invention provide techniques for dynamically introducing new components to be used during provisioning of solutions in services delivery environments such that drawbacks of the existing techniques are mitigated or eliminated. This is accomplished, for example, by a provisioning system that allows dynamic introduction of new provisioning components at runtime while providing metadata description of component's prerequisites and configuration and later using this information in a component's provisioning.

These and other objects, features, and advantages of the present invention will become apparent from the following detailed description of illustrative embodiments thereof, which is to be read in connection with the accompanying drawings.

BRIEF DESCRIPTION OF THE DRAWINGS

FIG. 6A demonstrates the overall flow, whereas FIG. 6B further illustrates step 606 of FIG. 6A related to the steps repeated for each individual component in accordance with illustrative embodiment.

DETAILED DESCRIPTION

It is understood that the term "runtime" generally refers to the operation of a computer program (or system) since the time the program started execution until the time it is terminated. Specifically, in accordance with principles of the invention, the term "runtime" refers to the time when the system is actually used by the customers (in production where changes can no longer be made to its design and implementation) as opposed to the period when it was still being designed and developed.

In a preferred embodiment, the term "component" refers to a piece of middleware that can be separately installed on one or more computers that can then be used by other middleware components or applications. For example, a component could be software such as that executed by an Oracle database server, an IBM Filenet or Weblogic Application Server. In a more generic case, a "component" can apply to anything that can be installed and configured for use by other components or solutions.

In a preferred embodiment, the term "solution" refers to a software application that provides a specific business capability such as an Human Resource application, an online banking application or a loan approval application. A solution is typically deployed on one or more computer systems on top of already installed middleware components. In a more generic case, the term "solution" can refer to a set of components, which use other already provisioned components as prerequisites, that provide specific business capability.

Figure 1:
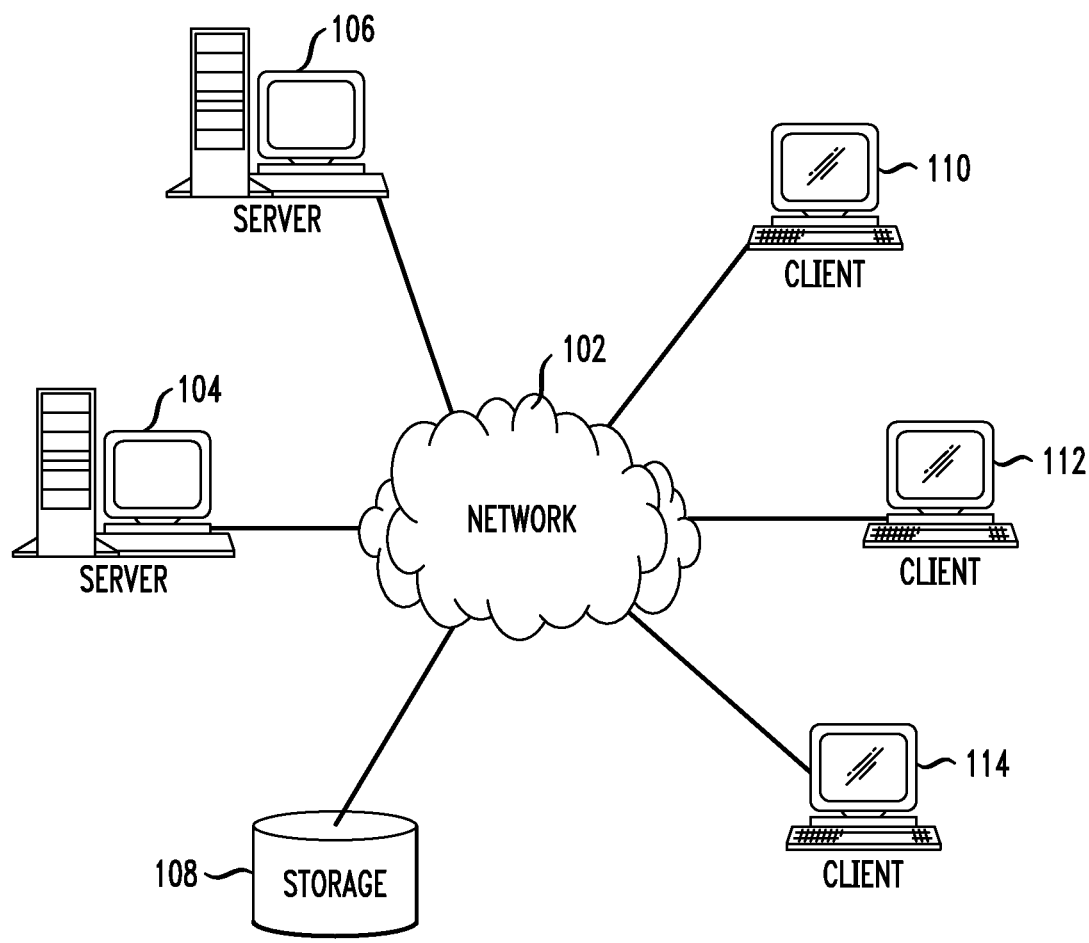
FIG. 1 depicts a pictorial representation of a network of data processing systems in which illustrative embodiments may be implemented.
Figure 2:
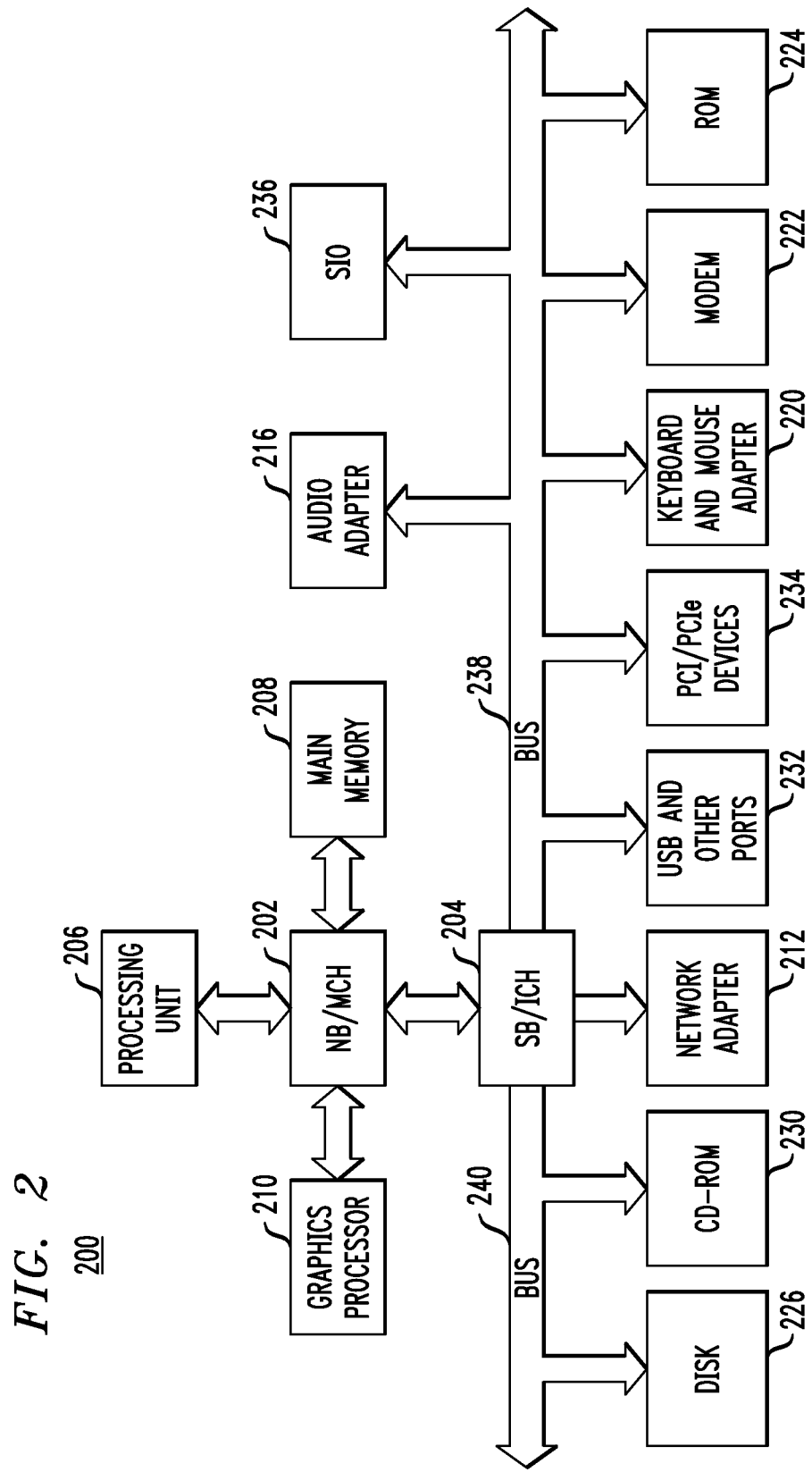
FIG. 2 depicts a block diagram of a data processing system in which illustrative embodiments may be implemented.

With reference now to the figures and in particular with reference to FIGS. 1-2, exemplary diagrams of data processing environments are provided in which embodiments may be implemented. It should be appreciated that FIGS. 1-2 are only exemplary and are not intended to assert or imply any limitation with regard to the environments in which embodiments may be implemented. Many modifications to the depicted environments may be made without departing from the spirit and scope of the illustrative embodiments.

With reference now to the figures, FIG. 1 depicts a pictorial representation of a network of data processing systems in which illustrative embodiments may be implemented. Network data processing system 100 is a network of computers in which embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, composed of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments.

With reference now to FIG. 2, a block diagram of a data processing system is shown in which illustrative embodiments may be implemented. Data processing system 200 is an example of a computer, such as server 104 or client 110 in FIG. 1, in which computer usable code or instructions implementing the processes for embodiments may be located.

In the depicted example, data processing system 200 employs a hub architecture including a north bridge and memory controller hub (MCH) 202 and a south bridge and input/output (I/O) controller hub (ICH) 204. Processor 206, main memory 208, and graphics processor 210 are coupled to north bridge and memory controller hub 202. Graphics processor 210 may be coupled to the MCH through an accelerated graphics port (AGP), for example.

In the depicted example, local area network (LAN) adapter 212 is coupled to south bridge and I/O controller hub 204 and audio adapter 216, keyboard and mouse adapter 220, modem 222, read only memory (ROM) 224, universal serial bus (USB) ports and other communications ports 232, and PCI/PCIe devices 234 are coupled to south bridge and I/O controller hub 204 through bus 238, and hard disk drive (HDD) 226 and CD-ROM drive 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM drive 230 may use, for example, an integrated drive electronics (IDE) or serial advanced technology attachment (SATA) interface. A super I/O (SIO) device 236 may be coupled to south bridge and I/O controller hub 204.

An operating system runs on processor 206 and coordinates and provides control of various components within data processing system 200 in FIG. 2. The operating system may be a commercially available operating system such as Microsoft® Windows® XP (Microsoft and Windows are trademarks of Microsoft Corporation in the United States, other countries, or both). An object oriented programming system, such as the Java™ programming system, may run in conjunction with the operating system and provides calls to the operating system from Java programs or applications executing on data processing system 200 (Java and all Java-based trademarks are trademarks of Sun Microsystems, Inc. in the United States, other countries, or both).

Instructions for the operating system, the object-oriented programming system, and applications or programs are located on storage devices, such as hard disk drive 226, and may be loaded into main memory 208 for execution by processor 206. The processes of the illustrative embodiments may be performed by processor 206 using computer implemented instructions, which may be located in a memory such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course, the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 208 or a cache such as found in north bridge and memory controller hub 202. A processing unit may include one or more processors or central processing units (CPUs). The depicted examples in FIGS. 1-2 and above-described examples are not meant to imply architectural limitations. For example, data processing system 200 also may be a tablet computer, laptop computer, or telephone device in addition to taking the form of a PDA.

The illustrative embodiments provide for a computer implemented method, data processing system, and computer usable program code for compiling source code. The computer implemented methods of the illustrative embodiments may be performed in a data processing system, such as data processing system 100 shown in FIG. 1 or data processing system 200 shown in FIG. 2.

Figure 3:
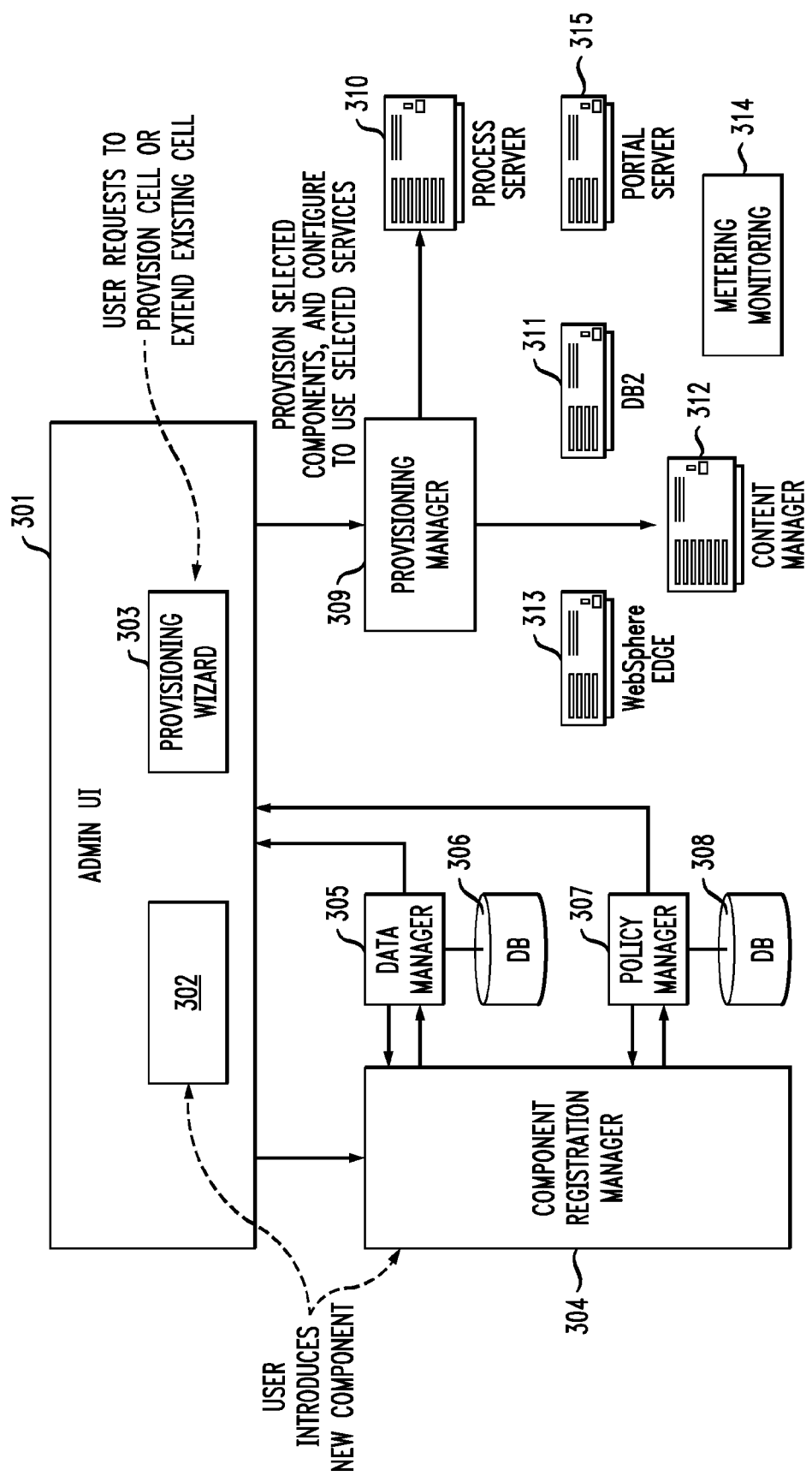
FIG. 3 depicts a schematic representation of the logical architecture of a management system in accordance with an illustrative embodiment.

FIG. 3 depicts a schematic representation of the logical architecture of a system in accordance with an illustrative embodiment. The processing is divided in three main sections: (1) Registration of new components and services, (2) selection of registered components and services in the user interface in submission of provisioning requests and (3) extension of an existing environment. The user introduces new components into the system either via the administrative user interface (301) or by providing component descriptor in a predefined format directly to the Component Registration manager (304). In a preferred embodiment, the component description is specified in XML (Extensible Markup Language), but other methods of describing a component (e.g., Unified Modeling Language or UML, text, JAVA property files) can be found by those skillful in the art. If the new component is introduced via the user interface or UI (301), the component registration processing subcomponent (302) of the administrative user interface (301) processes the information and passes the component descriptor to the component registration manager (304). Component Registration Manager (304) uses data manager (305) to process the component descriptor, generate cross-references between the new component and existing components and store the information in database (306). It further uses Policy Manager (307) to process new component's policies and save them in the repository (308). An example of the policies that could be present in the component descriptor are sharing policies that would specify if a component could be shared all middleware stacks in the provisioning system, across all solutions (offerings) deployed on a single middleware stack or across all tenants (users) of a single solution. Another example of policies are collocation policies describing if a component can be deployed on the same blade as other components and if so which components it can be collocated with.

After a component is introduced into the system as above, it can be selected for provisioning a new middleware stack or extension of an existing environment. The user uses provisioning screens (303) of the administrative user interface (301) to provision a complete middleware stack or to extend an existing stack with a new component. In a preferred embodiment, the provisioning UI (303) is implemented with a wizard where each component's information is shown on a separate screen, but other implementations can be realized by those skilled in the art.

Once components are selected and their configuration is chosen, the request is passed to the Provisioning Manager (309) that provisions each of the selected components on selected servers. For example, in FIG. 3, the user selected to provision Process server (310), Portal Server (315) using DB2 (311), Content Manager and its prerequisites (312), WebSphere Edge components (313) and use remote metering and monitoring services (314).

Figure 4:
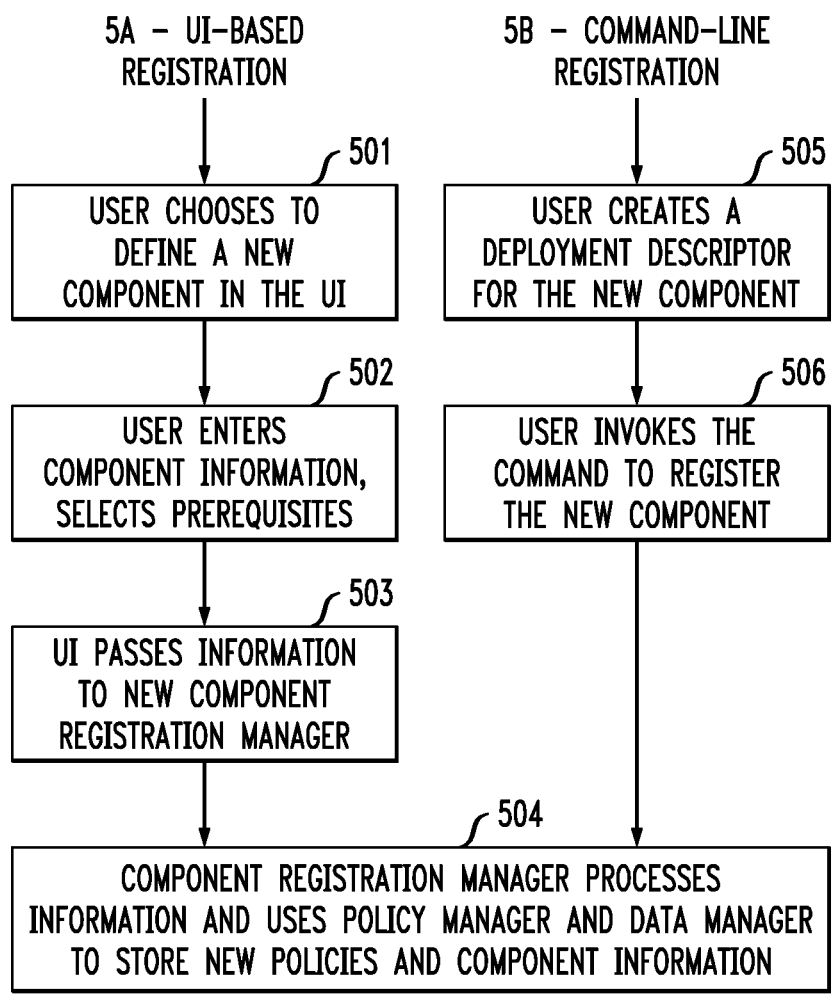
FIG. 4 depicts an example of a sample XML descriptor used during introduction of a new component into a provisioning system in accordance with illustrative embodiment.

FIG. 4 depicts a sample component descriptor that could be used during the registration of a new component or service. Each new component or service will have the following information specified at registration (either by entering parameters on the UI or by including a deployment descriptor or a combination of both):

Service/component name and version

Shared service/middleware component flag indicating how the provisioning request needs to be submitted; shared services may be remote services, so the server for them may be a remote URL (Uniform Resource Locator).

Sharing policies—across offerings/tenants/across all middleware stacks, etc.

In the UI, this is used specifically to determine if, when the choices of servers for provisioning is made, the servers that already have the component installed can be used.

Preinstalled flag—is the new component preinstalled or it needs to be/can be provisioned when the middleware stack is provisioned for solution hosting.

Affects which servers are shown if this component is selected during middleware stack install Prerequisite requirements Local prerequisites—installed on the same machine; prerequisites have to be already "known" to the UI and selected when component is introduced Prerequisites/dependencies that can be accessed remotely—list of other components (name & version) that have to be present in the cell (e.g. WebSEAL & TAM). (In another embodiment, a group of related components can be introduced together.)

Co-location policies—can it be deployed on the same servers as other components; could also be determined dynamically—e.g., if prerequisite versions conflict; or could be based on hardware requirements;

Hardware requirements (could be used in determining co-location policies)

Type of servers required: in a preferred embodiment the servers are divided into 3 pools based on their use, co-location and location (e.g. behind the firewall)—TPM (server used for provisioning), WebSeal servers (behind the firewall and only used to host Webseal), Number of additional servers: 1, "0 or more", etc required for this component during provisioning (UI will allow multiple selection)

List of additional parameters that need to be provided on the UI (other than server) with type for input validation (int/url/email/max length/port), similar to UI type definition present in prior art Can it be added to an already provisioned middleware stack?

Additional parameters can be considered. In some embodiments, only some of the parameters above need to be entered while other can be defaulted. In other embodiments, a location of the deployment descriptor can be specified in the UI while additional parameters are read from the descriptor. In more complex cases, the descriptor may include a link to a processor (e.g. Java class) that can both present the fields on the user interface (or provide an application programming interface or API to get field information) or perform its own validation or server selection procedures.

Figure 5:
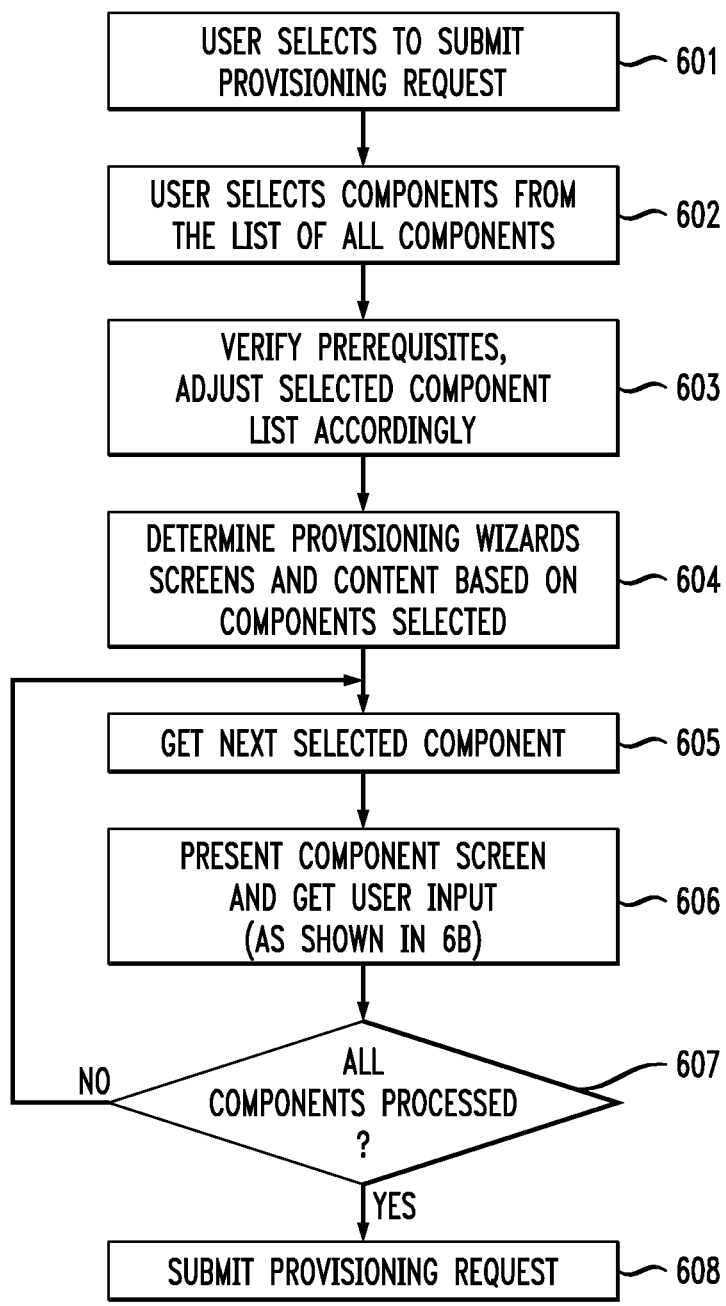
FIG. 5 contains a flowchart illustrating the steps performed during registration of new components and services in accordance with an illustrative embodiment.

FIG. 5 depicts a flowchart illustrating the first section of the new component processing—registration of new components or services.

In a UI-based registration shown on FIG. 5A, the user selects to define the new component feature of the administrative UI (301) in step (501), enters component information as described above, selects prerequisites from the list of already registered components (502) provided by the UI (301). If a required prerequisite is not found, it can be registered in this step as well. The Administrative UI's component registration subcomponent (302) performs minimal processing of the information (503) before passing it to the component registration manager (304). The component registration manager processes the information, cross-references the new components and its prerequisites, extracts the relevant policies and then uses policy manager (307) and data manager (305) to store the information in databases (306, 308) in step 504. In alternative embodiments, all of the processing can be done by the user interface or additional processors could be used.

In a registration that uses a deployment descriptor and a command-line interface as in FIG. 5B, user creates a deployment descriptor (505), issues the command to register the component (506). The command invokes the component registration manager (304) that registers the component (504) as described above.

Figure 6:
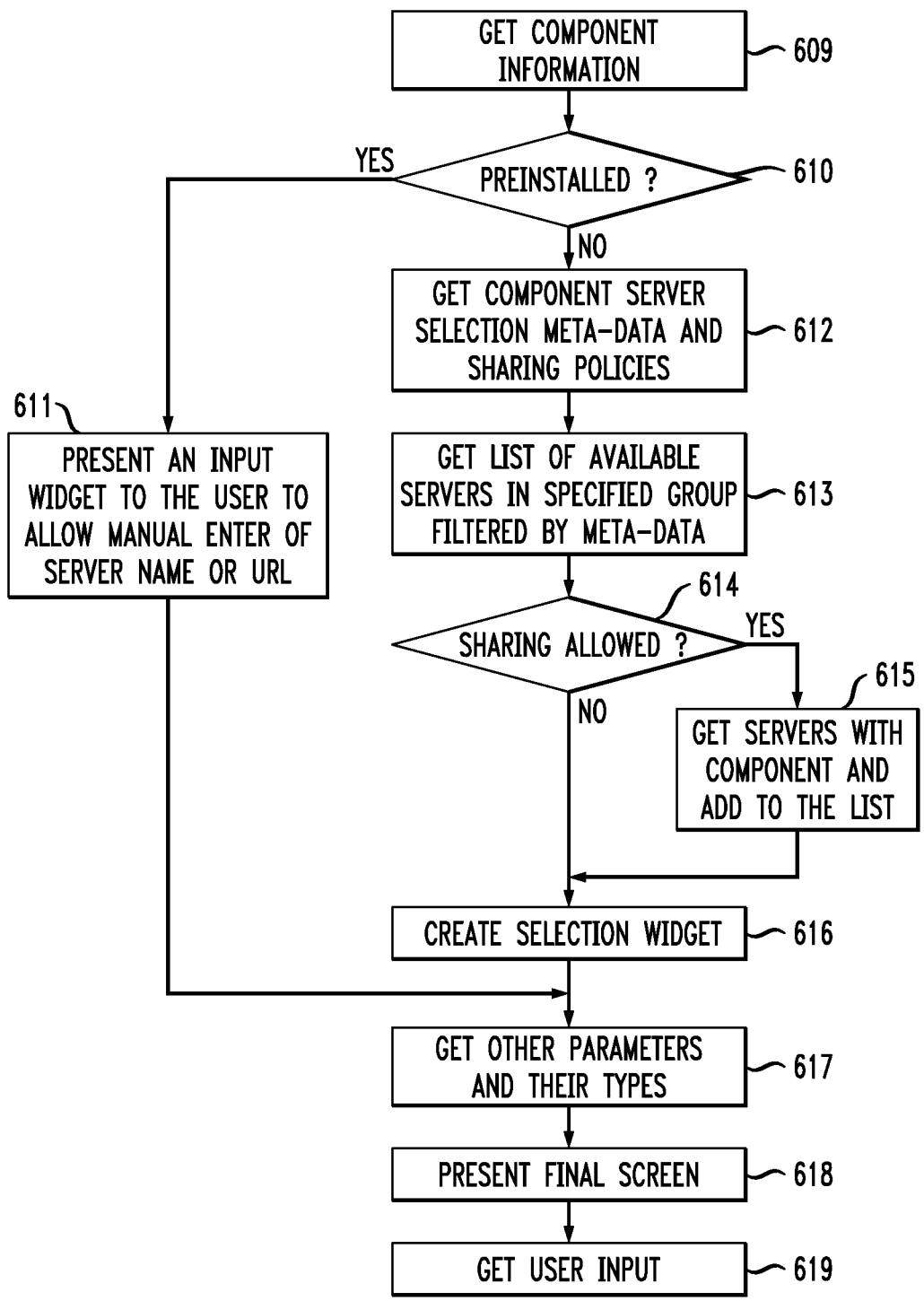
FIGS. 6A and 6B contain flowcharts illustrating the steps performed during selection of registered components and services in the user interface submission of submission of provisioning requests in accordance with illustrative embodiment.

FIGS. 6A and 6B depict flowcharts illustrating the second section of component processing—selection of registered components and services in the UI in submission of provisioning requests. FIG. 6A illustrates the overall processing, while FIG. 6B goes into details of the processing of each individual component (step 606).

In FIG. 6A, the user uses an option to submit a provisioning request in step 601. In step 602, the administrative UI (301) allows the user to select required components and services. After the user selects components and services (602), the administrative UI (301) verifies prerequisites for each component, adding the prerequisite components to the list if necessary (603). The administrative UI (301) then determines the necessary wizard screens to elicit the necessary configuration information from the user (604). In a preferred embodiment, each selected component results in wizard screen. In an alternative embodiment, the information could be presented on a single page. In yet another embodiment, related components could be grouped on a single screen while different screens could be used for the non-related components. Other embodiments, such as grouping by a physical server, or by prerequisites are also possible. For each component and service the component's screen content is defined by the metadata supplied during registration (FIG. 5). The user is then presented with each individual screen (605-607). The information about next component's screen is obtained (606), the screen content is determined and user input is obtained (607, FIG. 6B). When all components are processed (608), the provisioning request is submitted (609) to the provisioning manager (309).

FIG. 6B further illustrates the processing of each individual component referenced in step 606 in FIG. 6A. For each individual component the screen content is defined based on the meta-data supplied during registration as described in FIG. 5. First, the component metadata is obtained (609) from the data manager (305). If "preinstalled" flag is set to "true," the component is already installed. In this case, an input field that would allow a user to enter the component's server name or a URL (as defined in the metadata) is shown on the screen (611). If "preinstalled" flag in the metadata is set to "false" (610), the server selection widget is provided. The list of servers available for selection contains the list of servers filtered by the metadata settings. The component server selection metadata and sharing policies are obtained using data manager (305) and policy manager (307) in step 612. In step 613, the list of available servers in the specified group (e.g., DMZ, Application Zone, Management Zone, etc.) is obtained from the database (306) via data manager (305); this list may be further restricted by OS and capacity requirements obtained from the database in step 612. Additionally, this list may be further limited by the prerequisite checking against software already installed on each available servers and planned deployments in this request. For example, only Linux servers may be acceptable or servers with specific capacity or servers that already have prerequisites installed. If policies obtained from the policy manager (307) indicate that "shared" flag for the component is set to "true" (614), the servers with existing installation of this component or service are added to the list (615). The list of servers with existing installations is also potentially restricted by management policies such as load and security. Once the list is finalized, the selection widget is created (616). In alternative embodiment, the input field in step 611 can also be replaced by a selection widget containing the list of local servers that have this component or service installed as well as the ability to enter the remote server as an input. Other embodiments may also be apparent to those skilled in the art.

In step 617, the component's or service's parameters that require user input and their types are obtained from the data manager (305) and the final screen that includes both server input field (from step 611) or selection widget (616) as well as additional parameters (from step 617) is presented to the user (618) and user input is obtained and validated (619). The format of the fields as well as validation is based on the component attributes' description specified in the deployment descriptor and stored in the database (306). The method for presentation and validation of attributes is outside the scope of this disclosure and can utilize prior work such as for example XForms or the other known methods.

Figure 7:
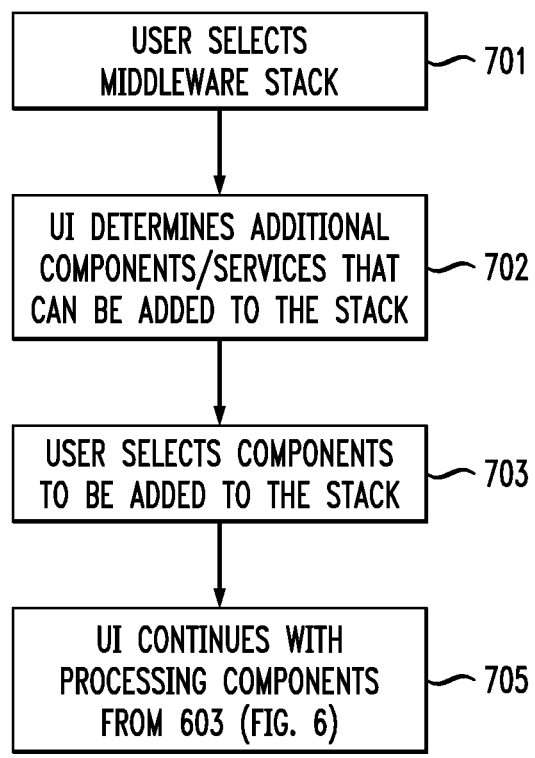
FIG. 7 contains a flowchart illustrating the steps performed during extension of an existing environment in accordance with an illustrative embodiment.

Once an environment is provisioned (as shown in FIGS. 6A and 6B), there may be times when a solution will share that environment but extend it with additional registered components or services. FIG. 7 depicts flowchart illustrating the third section of component processing—extension of existing environment. Here, the user examines the currently deployed middleware stack(s) and selects the desired target environment for provisioning a new solution (701). The UI restricts the list of registered components/services that may be leveraged with this deployment (702). This list will contain middleware components that according to their description may be added to the existing cell and don't conflict with current cell configuration. These could be new components that still need to be provisioned or the existing Shared components or services. The user will then select the new components from those listed (703) and proceed with specifying parameters for the selected components as illustrated in FIGS. 6A and 6B starting from step 603 in FIG. 6A.

The invention can take the form of an entirely different hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable storage medium providing program code for use by or in connection with a computer or any instruction execution system. For the purposes of this description, a computer-usable or computer readable storage medium can be any tangible apparatus that can contain or store the program for use by or in connection with the instruction execution system, apparatus, or device.

The medium can be an electronic, magnetic, optical, electromagnetic, infrared, or semiconductor system (or apparatus or device). Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. In a provisioning system that manages provisioning of components in a data processing system, an automated method of dynamically provisioning one or more new components in the data processing system, the method comprising the provisioning system performing steps of:
    accepting a registration of a new component to be added to the data processing system during a runtime period of the data processing system, wherein the new component comprises a software component that has not been previously registered in the data processing system prior to the runtime period, and further wherein the registration comprises obtaining information relating to one or more prerequisites for deploying the new component and a configuration associated with the new component;
    permitting selection of the registered new component in response to a provisioning request; and
    causing a modification to the data processing system by enabling use of the registered new component in the data processing system,
    wherein accepting the registration of the new component further comprises a user registering the new component via a user interface associated with the provisioning system wherein the user enters the information relating to at least one of the one or more prerequisites and the configuration associated with the new component into the provisioning system via the user interface, and wherein the user interface allows the user to manually select the one or more prerequisites from a list of already registered components.

2. The method of claim 1, wherein the registration of the new component further comprises a user registering the new component via entry of a deployment descriptor.

3. The method of claim 1, wherein the registration of the new component further comprises a component registration management module associated with the provisioning system processing the obtained information relating to at least one of the one or more prerequisites and the configuration associated with the new component.

4. The method of claim 3, wherein the processing step further comprises the component registration management module cross-referencing at least a portion of the obtained information associated with the new component with corresponding information associated with an existing, already-registered component in the data processing system.

5. The method of claim 3, wherein the processing step further comprises the component registration management module determining at least one policy applicable to the new component.

6. The method of claim 5, wherein the applicable policy further comprises one or more of a policy indicative of how the new component is to be shared in the data processing system.

7. The method of claim 1, wherein the step of the provisioning system permitting selection of the registered new component in response to a provisioning request further comprises a user selecting the registered new component via a user interface associated with the provisioning system.

8. The method of claim 7, wherein the user interface used for selection further comprises a separate screen for each registered component that the user is permitted to select.

9. The method of claim 1, further comprising the step of using the new component as a prerequisite for provisioning another new component.

10. The method of claim 1, wherein the new software component comprises at least one of a middleware component, and an operating system component.

11. The method of claim 1, wherein the obtained information is in the form of metadata described in Extensible Markup Language.

12. The method of claim 1, wherein a component prerequisite comprises at least one of a local prerequisite and a remote prerequisite.

13. The method of claim 1, wherein a component prerequisite comprises a specification of at least one of a type and a number of servers required to provision the component.

14. The method of claim 13, wherein the specification further comprises a filter that narrows server selection.

15. The method of claim 1, wherein the modification to the data processing system comprises at least one of deployment and installation of the registered new component.

16. The method of claim 1, wherein the one or more prerequisites comprise one or more existing, already-registered components in the data processing system.

17. The method of claim 1, wherein the one or more prerequisites comprise one or more components to be registered prior to use of the new component.

18. An article of manufacture for dynamically provisioning one or more new components in a data processing system via a provisioning system that manages provisioning of components in the data processing system, the article comprising a computer readable storage medium having one or more programs embodied therewith wherein the one or more programs, when executed by a computer, perform steps of:

accepting a registration of a new component to be added to the data processing system during a runtime period of the data processing system, wherein the new component comprises a software component that has not been previously registered in the data processing system prior to the runtime period, and further wherein the registration comprises obtaining information relating to one or more prerequisites for deploying the new component and a configuration associated with the new component;

permitting selection of the registered new component in response to a provisioning request; and causing a modification to the data processing system by enabling use of the registered new component in the data processing system, wherein accepting the registration of the new component further comprises a user registering the new component via a user interface associated with the provisioning system wherein the user enters the information relating to at least one of the one or more prerequisites and the configuration associated with the new component into the provisioning system via the user interface, and wherein the user interface allows the user to manually select the one or more prerequisites from a list of already registered components.

19. In a provisioning system that manages provisioning of components in a data processing system, apparatus for dynamically provisioning one or more new components in the data processing system, the apparatus comprising:

a memory; and a processor operatively coupled to the memory and configured to:

accept a registration of a new component to be added to the data processing system during a runtime period of the data processing system, wherein the new component comprises a software component that has not been previously registered in the data processing system prior to the runtime period, and further wherein the registration comprises obtaining information relating to one or more prerequisites for deploying the new component and a configuration associated with the new component;

permit selection of the registered new component in response to a provisioning request; and cause a modification to the data processing system by enabling use of the registered new component in the data processing system, wherein the processor is configured to accept the registration of the new component by presenting a user interface associated with the provisioning system, wherein the user interface allows the user to enter the information relating to at least one of the one or more prerequisites and the configuration associated with the new component into the provisioning system via the user interface, and wherein the user interface allows the user to manually select the one or more prerequisites from a list of already registered components.

20. The apparatus of claim 19, wherein the registration of the new component further comprises a user registering the new component via entry of a deployment descriptor.

21. The apparatus of claim 19, wherein the registration of the new component further comprises a component registration management module processing the obtained information relating to at least one of the one or more prerequisites and the configuration associated with the new component, and wherein the processing step further comprises the component registration management module cross-referencing at least a portion of the obtained information associated with the new component with corresponding information associated with an existing, already-registered component in the data processing system.

22. The apparatus of claim 19, wherein the registration of the new component further comprises a component registration management module processing the obtained information relating to at least one of the one or more prerequisites and the configuration associated with the new component, wherein the processing step further comprises the component registration management module determining at least one policy applicable to the new component, and wherein the applicable policy further comprises one or more of a policy indicative of how the new component is to be shared in the data processing system.

23. The apparatus of claim 19, wherein the step of the provisioning system permitting selection of the registered new component in response to a provisioning request further comprises a user selecting the registered new component via a user interface.

24. The apparatus of claim 23, wherein the user interface used for selection further comprises a separate screen for each registered component that the user is permitted to select.

* * * * *